July 30, 1929. H. E. JOHNSON 1,722,921
CREAM CAN COVER
Filed Nov. 21, 1927
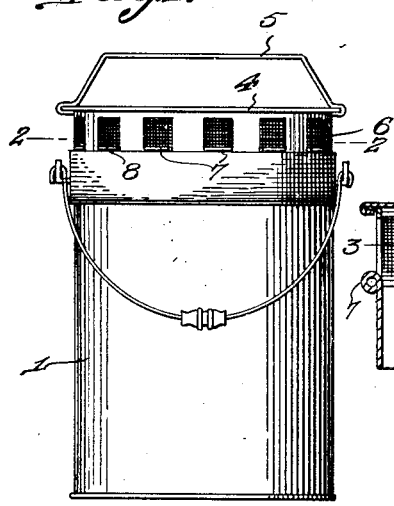
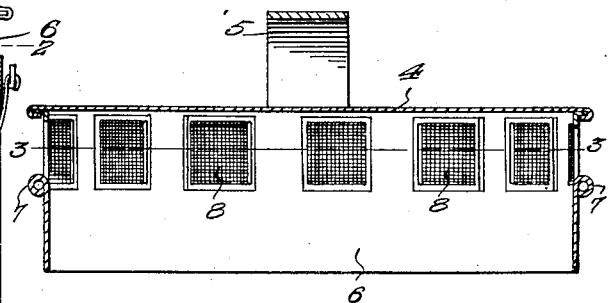
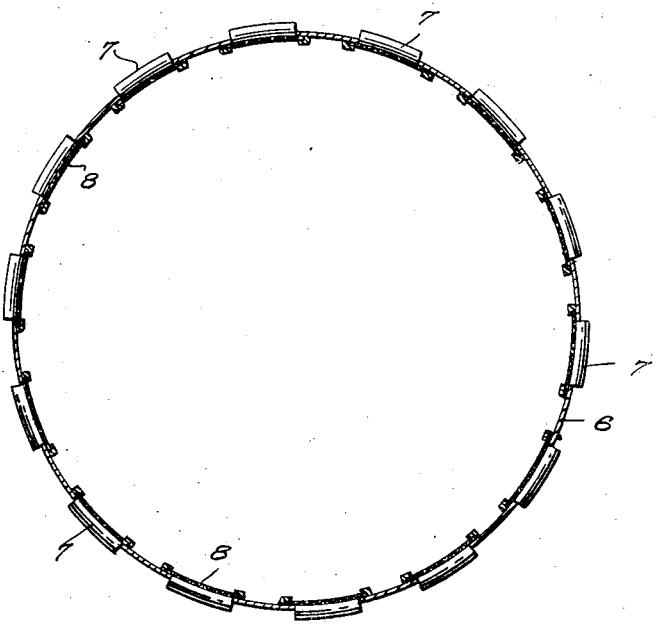
Herbert E. Johnson,
INVENTOR
BY Victor J. Evans
ATTORNEY Patented July 30, 1929.

1,722,921

UNITED STATES PATENT OFFICE.

HERBERT E. JOHNSON, OF AMERY, WISCONSIN.

CREAM-CAN COVER.

Application filed November 21, 1927. Serial No. 234,834.

My present invention has reference to a cover for cans or containers for cream and my object is the provision of a cover for this purpose which will permit of a free circulation of outside air therethrough, and prevent the entrance of insects, dirt or the like through said cover.

A further object is the provision of a cover for cream cans or containers that shall comprise a flanged member having its side or flange at equidistantly spaced intervals formed with openings which, however, are closed by fine mesh and the cover at the lower edges provided by the openings being formed with beads that contact directly with the outer edge or mouth of the cream can, and afford stops for limiting the movement of the cover into the can, the fine mesh in the openings affording a free circulation of outside air over the cream to preserve such cream, and the said mesh likewise preventing the entrance of insects, dirt, etc., to the cream.

To the attainment of the foregoing the invention consists in the improvement as hereinafter described and definitely claimed.

In the drawings:

Figure 1 is a side elevation illustrating my improvement in applied position.

Figure 2 is a view taken on approximately the line 2—2 of Figure 1.

Figure 3 is a sectional view approximately on the line 3—3 of Figure 2.

In the drawings, the numeral 1 designates a can or container for cream, the same being of the usual construction. The can containing the cream is designed to have arranged thereon a cover in accordance with this invention. The cover comprises a top 4 provided with a handle 5 and a depending skirt or flange 6. The flange or body portion 6 of the cover, at a suitable distance from the top 4 is slitted both longitudinally and transversely to provide a series of equidistantly spaced openings. Preferably the metal bounded by the slits is rolled upon itself to provide beads 7, each of the said beads being disposed in the same plane and in a line with the lower walls provided by the substantially rectangular openings. All of the openings are covered by plates of fine mesh 8. The mesh preferably is of wire.

The cover, when inserted in the mouth of the cream containing can 1, will have its beads 7 contact with the outer edge of the said mouth of the can or container so that the cover is thus limited in its movement when inserted in the can and likewise effectively supported on the can. The finely woven mesh 8 permits of a free circulation of outside air into the cover and consequently all the cream in the can to effectively preserve the cream. The mesh will prevent the entrance of insects, dirt, etc., into the cover and onto the cream.

The simplicity and advantages of my improvement will, it is thought, be apparent to those skilled in the art to which such invention relates so that further detailed description will not be required.

Having described the invention, I claim:

As an article of manufacture, a cream can cover comprising a cylindrical member having a closed top, the body of said member having its sides at equidistantly spaced intervals slitted longitudinally and transversely and the metal bounded by the slits being rolled downwardly to provide the said member with outstanding beads, all arranged in the same plane and designed to serve as stop elements when the cover is inserted in the mouth of a cream can and the openings thus provided in the cover closed by closely woven mesh plates.

In testimony whereof I affix my signature.

HERBERT E. JOHNSON.